United States Patent [19]

Kimberlin

[11] Patent Number: 5,307,369
[45] Date of Patent: Apr. 26, 1994

[54] LASER BEAM COMBINATION SYSTEM

[75] Inventor: Dwight E. Kimberlin, Indianapolis, Ind.

[73] Assignee: Electrox, Inc., Indianapolis, Ind.

[21] Appl. No.: 66,899

[22] Filed: May 21, 1993

Related U.S. Application Data

[63] Continuation of Ser. No. 879,756, May 6, 1992, abandoned.

[51] Int. Cl.$^5$ .................................................. H01S 3/08
[52] U.S. Cl. ..................................... 372/108; 372/20; 372/72; 372/97; 372/107
[58] Field of Search ...................... 372/20, 25, 29, 31, 372/32, 23, 108, 97, 107, 103, 99, 18, 72

[56] References Cited

U.S. PATENT DOCUMENTS

| | | |
|---|---|---|
| 3,510,798 | 5/1970 | Briones . |
| 3,855,544 | 12/1974 | Bowness . |
| 4,707,073 | 11/1987 | Kocher ................................ 385/100 |
| 4,805,181 | 2/1989 | Gibson et al. ......................... 372/72 |
| 4,857,697 | 8/1989 | Melville ........................... 219/121.63 |
| 4,873,417 | 10/1989 | Moriyasu et al. ................. 219/121.6 |
| 5,029,964 | 7/1991 | Edwards et al. ....................... 385/33 |
| 5,081,636 | 1/1992 | Bishop ................................... 372/72 |
| 5,093,551 | 3/1992 | Bishop ................................... 372/72 |

FOREIGN PATENT DOCUMENTS

| | | | |
|---|---|---|---|
| 0163681 | 7/1986 | Japan .................................. 372/108 |
| 0284986 | 12/1986 | Japan .................................. 372/108 |
| 62-329923 | 12/1987 | Japan . |

OTHER PUBLICATIONS

Domenico, Jr. Characteristics of a Single-Frequency Michelson-type He–Ne Gas Laser; Aug. 1966, IEEE Journal of Quantum Electronics, pp. 311–322.

Berzing, Passive Negative Coupling in Solid–Laser Resonator; Nov. 1974; Journal of Applied Spectroscopy, pp. 18–20.

Ireland, "Deep Penetration Welding with kW YAG Laser Beams", Welding Review, Feb., 1989, pp. 39–42.

Neiheisel, "High Speed Laser Welding of Deep Drawing Low Carbon Steel", ICALEO '88, Proceedings of Laser Materials Processing.

Beyer, et al., "Influence of Laser Beam Polarization in Welding", IFS Conferences, 35–39 High St., Kempston, Bedford, MK42 7BT, England, May 1988.

Heyden, et al., "Laser Welding of Zinc Coated Steel", IFS Conferences, 35–39 High St., Kempston, Bedford, MK42 7BT, England, Jun. 1987.

Primary Examiner—Georgia Y. Epps
Attorney, Agent, or Firm—Locke Reynolds

[57] ABSTRACT

A system for combining a plurality of laser beams into a combined output beam from at least two laser sources includes the removal of conventional perpendicularly oriented output windows from each of the laser sources. Reflecting mirrors are positioned perpendicular to the optical axis at the rear of the two laser sources. A fully reflecting mirror is positioned perpendicular to the optical axis of the first laser source to reflect coherent light received from the first laser source. A beam splitter is positioned between the first laser source and the fully reflecting mirror at the intersection of the optical axes of the first and second laser source. The beam splitter directs a portion of received coherent light into a combined output beam, with the remainder being directed back to the first and second laser sources.

15 Claims, 2 Drawing Sheets

LASER BEAM COMBINATION SYSTEM

This application is a continuation of U.S. application Ser. No. 07/879,756, filed May 6, 1992, now abandoned and entitled "Laser Beam Combination System".

BACKGROUND OF THE INVENTION

This invention relates to a laser system incorporating a plurality of laser sources and having an output along a common optical axis to alternatively allow selection of increased coherent light intensity or increased repetition rate of laser pulses. The laser system is of particular utility for industrial laser applications.

Industrial laser applications such as welding and cutting metals typically require pulsed lasers that are operated to have a high average power. Traditional approaches for increasing average laser power of conventional industrial ND-YAG lasers have included provision of an oscillator with several amplifying rods in series, mirror or fiber optic systems that direct laser beams to a common focus, or mechanical mirror cutting systems that direct laser beams into a common beam path. However, amplifying laser rods or heads positioned in series may have reduced efficiency, and mirror or optic fiber systems degrade laser beam quality, laser beam diameter, and depth of focus. Further, mechanical mirror cutting systems using a rotating mirror system that periodically interrupts and redirects laser beams are prone to mechanical failure.

SUMMARY OF THE INVENTION

The present invention provides a laser beam combination system for directing a plurality of laser beams along a common optical output axis. The laser beams can be synchronously emitted and combined to increase peak power delivery, or can alternatively be emitted by laser sources at temporally discrete intervals along the same optical axis to increase pulse repetition rate. Preferably, the laser beam combination system includes a first laser source having an optical axis for coherent light amplification. A first reflecting mirror is positioned perpendicular to the optical axis of the first laser source. Typically, when conventional pulse mode Nd-YAG lasers are used, the coherent light produced by the first laser source can be combined with that produced by a second laser source having a second, nonparallel optical axis for coherent light amplification. A second reflecting mirror, similar in design and function to the first reflecting mirror, is positioned perpendicular to the optical axis of the second laser source.

Instead of standard, partially reflective and perpendicularly oriented output windows positioned in front of each laser source, the present invention provides a common output window assembly for the first and second laser sources. The common output window assembly includes a fully reflecting mirror positioned to reflect coherent light received from the first laser source back toward the first laser source. The common output window assembly also includes a first surface beam splitter (usually a conventional partially reflecting plane mirror having a light mirror coating on one side and an antireflection coating on the other, although other beam splitter configurations may be used) positioned between the first laser source and the fully reflecting mirror along the optical axis of the second laser source. The beam splitter reflects coherent light from the first laser source into the common optical output axis of the combined output beam, while also reflecting coherent light received from fully reflecting mirror into the second laser source. Usually the beam splitter includes a multi-layered dielectric coating that reflects about 50% of incident light, transmitting the remainder therethrough.

In other preferred embodiments, average power of the laser beam combination system can be increased by providing a plurality of laser sources or amplifiers positioned to receive coherent light of the combined output beam to further amplify the combined output beam. In addition, a third laser amplifier can positioned along the optic axis of the second laser source between the second laser source and the second reflecting mirror to amplify the coherent light output. A fourth, a fifth, or even sixth laser amplifier can be positioned along the optical axis of the second laser source to receive coherent light of the combined output beam to further amplify the combined output beam, with the fourth laser amplifier amplifying output of the second and third laser amplifier, the fifth laser amplifier amplifying the output of the first and second laser sources, and the sixth laser amplifier amplifying the output of the first and third laser amplifier.

In addition to increasing peak power output of the combined laser output beam pulse, a laser beam combination system in accordance with the present invention can be used for directing a plurality of laser beams along a common optical output axis. The pulses of each laser can be timed to increase the repetition rate, increasing the average power over time. A first laser source operated in a pulse mode and having an optical axis for coherent light amplification is positioned adjacent to a first reflecting mirror. The first reflecting mirror is positioned perpendicular to the optical axis of the first laser source. A second laser source for coherent light amplification is also provided, the second laser source being operated in a pulse mode and having an optical axis coincident with the common optical output axis, with the coherent light amplification pulse occurring before or after the coherent light amplification pulse of the first laser source. Adjacent to the second laser source, a second reflecting mirror is positioned perpendicular to the optical axis of the second laser source and the common optical output axis. A fully reflecting mirror is positioned to reflect coherent light received from the first laser source, and a first surface beam splitter such as previously described directs the output beam.

The present invention functions as a split feedback oscillator for multiple laser amplifier heads, with personal and common feedback mirrors acting to provide conditions for coherent optical amplification. Primary and secondary feedback is controlled by the common output beam splitter positioned at the intersection of the optical axes of the amplifier heads and directing a common output laser beam. The reflection/transmission surfaces of the planar beam splitter have conventional multilayer reflection coatings on one side, and conventional anti-reflection coatings on the other side. Typically, the reflection coatings are on the side of the beam splitter initially receiving coherent laser beams from the first laser source.

The various features and advantages of the invention will become more apparent to those skilled in the art upon consideration of the following detailed description of a preferred embodiment exemplifying the best mode of carrying out the invention as presently perceived. The detailed description particularly refers to the accompanying drawings.

DESCRIPTION OF THE PREFERRED EMBODIMENT

Figure 1:
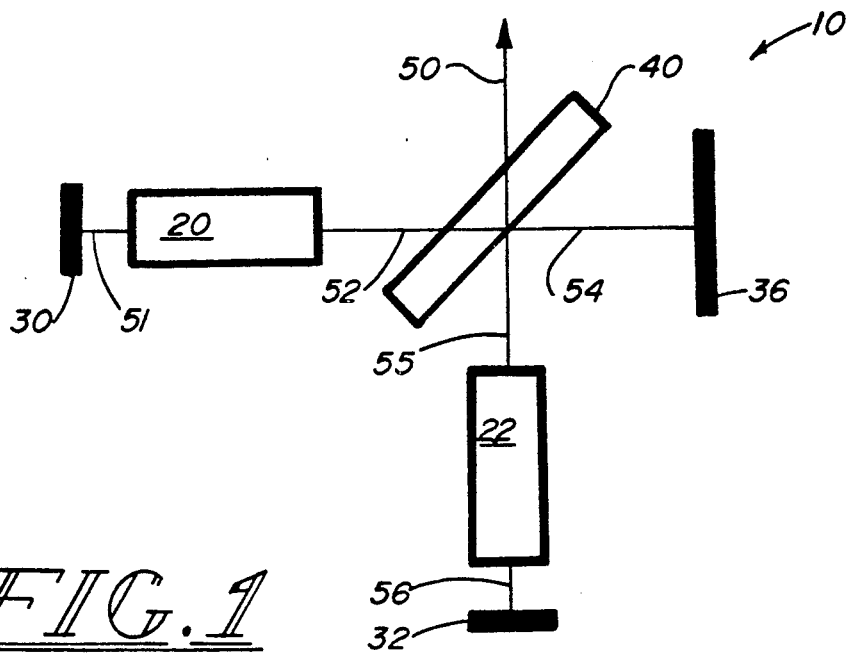
FIG. 1 is a schematic view of a laser beam combination system having two pulsed laser sources with an output capable of being combined into a single higher energy laser beam output pulse, or having pulses interleaved to increase the repetition rate of the laser system.

As schematically illustrated in FIG. 1, a laser beam combination system 10 for directing, simultaneously or alternately, a plurality of laser beams along a common optical output axis includes a first laser source 20 and a second laser source 22. Laser sources 20 and 22 can be of any conventional design, and can operate in pulse or continuous mode. The laser sources 20 and 22 are configured to contain a gas, liquid, or solid active medium capable of being excited by an external power source (not shown) to produce a population inversion of atoms in the active medium. Conventional auxiliary equipment (not shown) such as support mounts, coolant systems, and other necessary associated equipment known to those skilled in the art are present in operative embodiments. Incoherent light sources, chemical reactions, or other known energy sources can be used to "pump" the active medium to create a reservoir of high energy level atoms. This pumping action creates a nonstable equilibrium in which an input photon in a given frequency and polarization mode can induce an atom in an upper energy level to undergo a transition to a lower energy level, emitting another photon with the same frequency, direction, and polarization as the input photon. If a sufficient number of upper energy level "active" atoms are present to produce photons in excess of photon losses to scattering and absorption, the pumped active medium amplifies the input photons.

For high power industrial applications, solid state ND-YAG lasers operated in pulse mode are widely available. Such lasers are compact, rugged, and suitable for use in harsh industrial environments. ND-YAG lasers, such as those supplied by the assignee, Electrox, Inc., are suitable for use because of their reliability, long functioning lifetime, and ease of serviceability. Typically, ND-YAG lasers are operated by situating an active ND-YAG medium in a Fabry-Perot optical resonator consisting of two mirrors separated by a defined distance, with one mirror being nearly fully reflective and the other being partially reflective. The partially reflective window, commonly known as the output window, is normally situated on the same optical axis as the fully reflective mirror and the active medium. When the active medium is pumped above a minimum threshold, photons are reflected back and forth between the two mirrors, initiating a laser cascade, a portion of which leaves through the output window and is directed into optical, welding, or other industrial laser systems.

The present invention modifies the traditional Nd-YAG resonator system both by the use of multiple laser sources and by removing the respective output windows of each laser source, substituting therefore a common output window assembly. A combination of mirrors on the optical axis of each laser amplifier is used to produce a resonator system with lasing activity. For example, as seen in FIG. 1, a first reflecting mirror 30 is positioned perpendicular to the optical axis of first laser source 20 and a second reflecting mirror 32 is positioned perpendicular to the optical axis of the second laser source 22. Coherent light output of the first laser source 20 is directed toward a fully reflecting mirror 36. Interposed between the first laser source 20 and the fully reflecting mirror 36 is a first surface beam splitter 40. The mirror 40 is positioned at the intersection of the optical axes of the first laser source 20 and the second laser source 22, and is positioned at an angle relative to both axes.

Conventional mirrors and beam splitters can be used to construct an output window capable of accomodating a plurality of laser sources in accordance with the present invention. Typically, the fully reflecting mirror 36 is configured to have less than 1% loss to absorption or scattering, and is constructed to have a planar geometry, although of course alternative mirror/optic systems including prisms, curved mirrors, lenses, etc., may also be employed. The beam splitter 40 is provided with conventional reflective dielectric coatings on one side, with the other side being coated with conventional anti-reflective coatings to reduce reflection losses. The beam splitter 40 is conventionally constructed to transmit about 50% of the incident coherent light, with most of the remaining light passing through unabsorbed.

As will be appreciated by those skilled in the art, intermediary optical elements such as mirrors, lenses, prisms, or optic fibers can be positioned to redirect the optical axis of the laser sources. For example, laser source 20 can be positioned so that its optical axis is parallel to the optical axis of laser source 22. An intermediary reflective mirror positioned at a 45 degree angle relative to the optical axis of the first laser source 20 can be used to redirect (by 90 degree specular reflection) coherent light leaving laser source 20 to intersect the beam splitter 40. Similarly, right angle prisms or fiber optics can be used. However, to increase efficiency, reduce alignment problems, and minimize material costs it is generally advantageous to minimize the requirement for intermediary optical elements by proper positioning of the laser sources, beam splitters, and fully reflective mirror.

In operation, laser output (represented by line 50) is produced by sustained resonant oscillation of coherent light through the laser sources 20 and 22, as controlled by multiple reflections off mirrors 30, 32, 36, and beam splitter 40. These coherent light reflections are represented by lines 51, 52, 55, and 56, which are intended to represent coherent light traveling in both directions along the lines. Laser beam combination proceeds, for example, by simultaneously pumping the active medium of laser sources 20 and 22 with flash lamps (not shown). A photon leaving the laser source 20 can be randomly directed, for example, toward the first reflecting mirror 30. This photon (shown as line 51) is reflected from the mirror 30, and reverses its direction to move back into the laser source 20. Here the photon encounters an active atom at an upper energy, which it stimulates to emit another photon of identical frequency, polarization, and direction. The pair of coherent photons respectively-encounter additional active atoms in the active medium to create still more coherent photons. The coherent photons eventually leave the laser source 20 to pass toward the beam splitter 40. When the coherent photons encounter the beam splitter 40, about 50% are reflected to provide output beam 50. The remainder pass through splitter 40 and proceed (line 54) to be reflected backwards from fully reflective mirror 36 towards the beam splitter 40. Again, about 50% of the coherent photons are reflected, but this time they are directed toward the laser source 22.

The remaining coherent photons proceed (line 53) back toward laser source 20. These coherent photons pass through the laser source 20 to create still more coherent photons, which exit the laser amplifier for reflection from the mirror 30. This positive feedback process is multiply repeated to create substantial numbers of coherent photons, at least until the number of active atoms in the active medium drops below sub-stainable lasing threshold.

A certain percentage of coherent photons directed toward the laser source 22 by reflection from beam splitter 40 also eventually proceed back along line 52 to sustain coherent photon production, similar to that previously described for those coherent photons that travel from line 54 through beam splitter 40 and along lines 53, 52. The coherent photons reflected (line 55) by beam splitter 40 toward laser source 22 pass into the laser source to trigger a coherent photon cascade similar to that described in connection with laser amplifer 20. The coherent photons leave the laser source 22 (line 56), are reflected back into the laser source 22 to trigger production of still more coherent photons. These photons leave (line 55) the laser source directed toward the beam splitter 40. About 50% of the coherent photons pass through the beam splitter 40 are combined with coherent photons arriving from the laser source 20 (lines 52 and 53). The remaining coherent photons are directed (line 54) toward mirror 36, which as previously described reflects the coherent photons toward the beam splitter 40. The process of coherent photon production, with some coherent photons passing through the beam splitter 40 toward laser source 20, and the remaining coherent photons being directed back to laser source 22, is again repeated. Although the exact energy of the combined output beam 50 depends upon the active medium employed, scattering and absorption losses, time and energy of pumping action, and other factors known to those skilled in the art, typically two 400 watt laser sources can be combined as described to produce about 800 watts of laser output with minimal degradation in beam diameter and focus as compared to a 400 watt laser amplifier alone.

As will be appreciated by those skilled in the art, pulsed operation is not required for operation of the described embodiment. Low power continuous laser amplifiers can also be combined to double the power of the output beam. In addition, the system 10 as shown in FIG. 1 can also be operated to increase repetition of laser pulses. Instead of simultaneously pumping the laser sources 20 and 22, the laser sources 20 and 22 are alternately pumped, providing a series of laser beams directed along the same optical axis. In this mode, losses due to absorption and scattering in the non-active, "cold" laser source are slightly increased, but the repetition rate of the system can be doubled as compared to a single laser amplifier, while still delivering full rated power.

Figure 2:
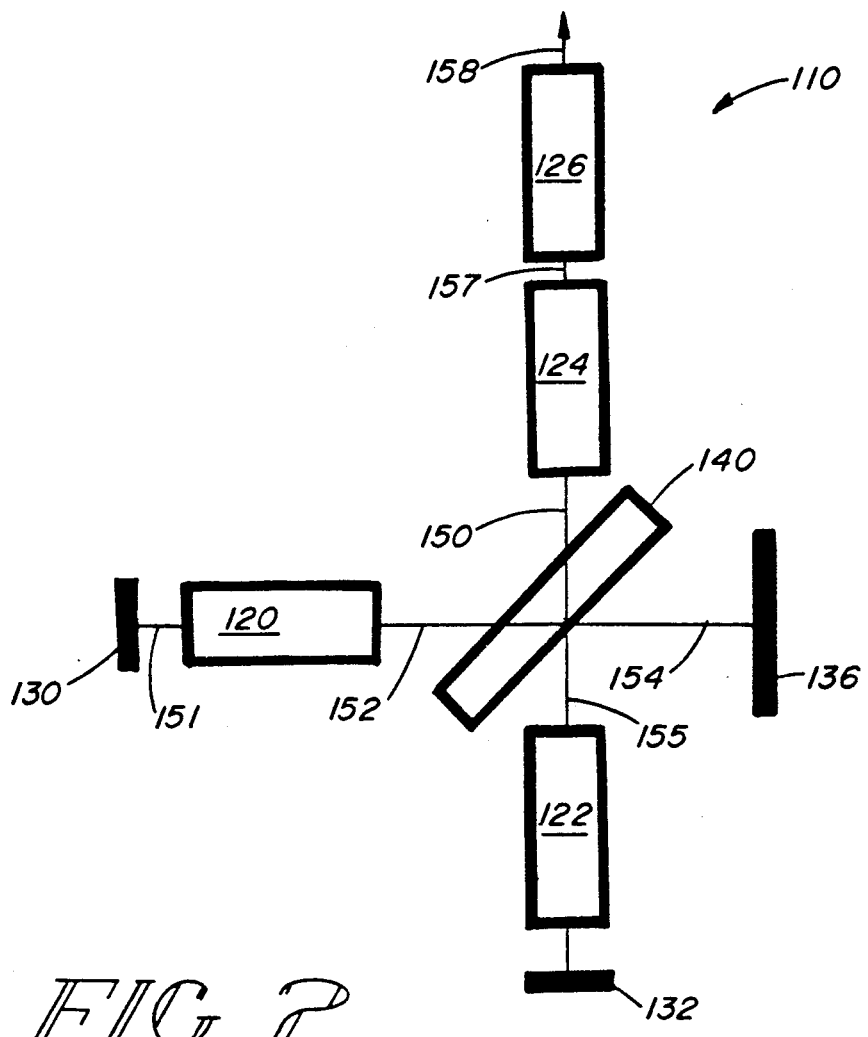
FIG. 2 is a schematic view of a laser beam combination system having two additional laser amplifiers positioned to amplify the combined laser output beam.

An alternative embodiment similar to that shown in FIG. 1 is illustrated in FIG. 2, in which corresponding elements have similar numbers (i.e. laser source 20 of FIG. 1 corresponds to laser source 120 of FIG. 2).

Operation of system 110 is similar to that previously described for system 10 of FIG. 1, with the following exceptions. To increase average laser power output, a third laser amplifier 124 and a fourth laser amplifier 126 are positioned along the optical axis of the second source 122 to receive output beam 150. Coherent light passes between laser amplifiers 124 and 126 (line 157) and is emitted as an output beam 158 from laser amplifier 126.

In operation, laser amplifier 124 is synchronously pumped with laser source 120, and laser amplifier 126 is synchronously pumped with laser source 122. This effectively doubles the repetition rate as compared to system 10 of FIG. 1, while also doubling the peak pulse power generated along the same optical axis.

Figure 3:
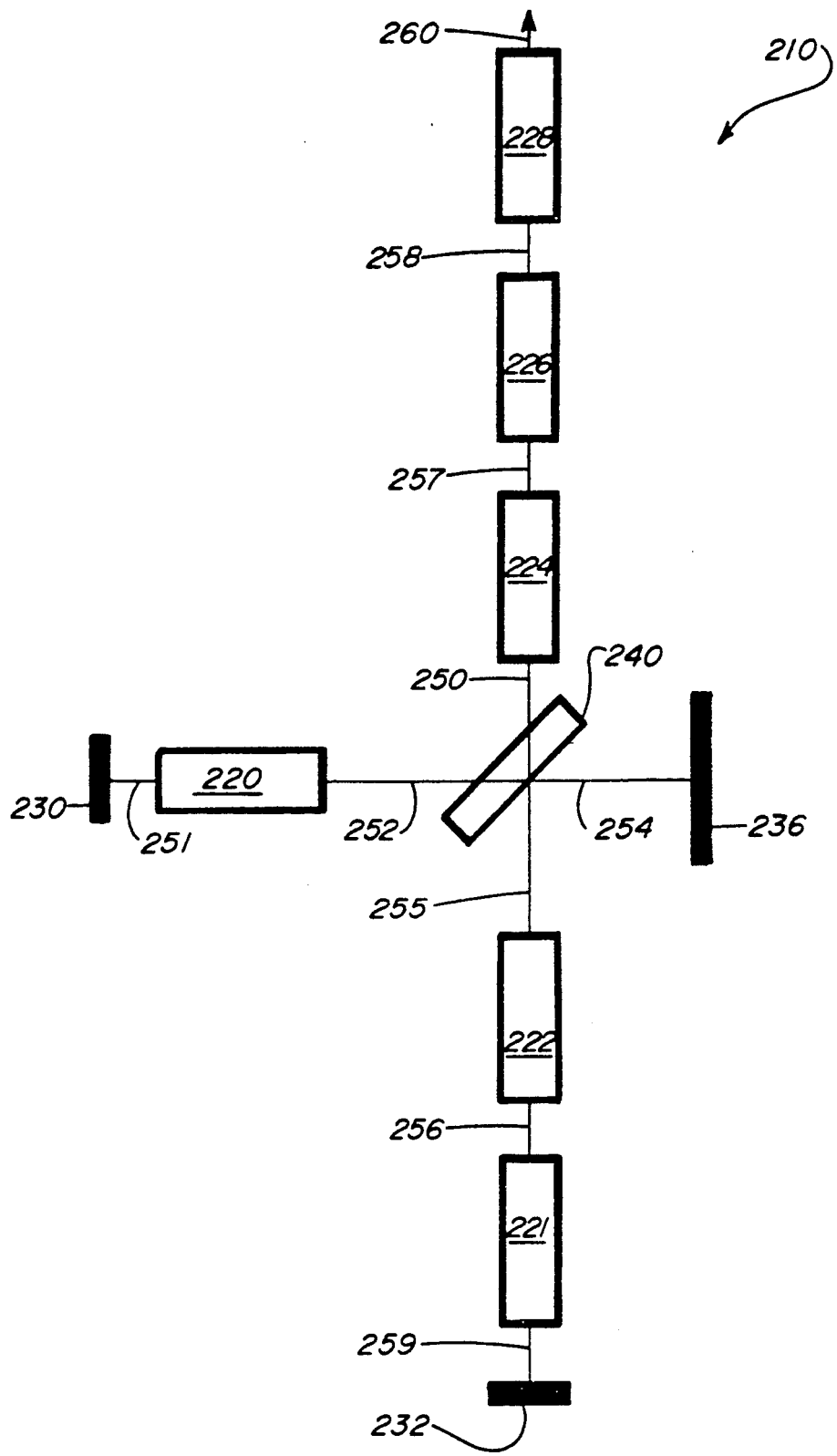
FIG. 3 is a schematic view of a laser beam combination system having a plurality of laser amplifiers.

Another embodiment is illustrated in FIG. 3, which like FIG. 2 has elements numbered to correspond to FIG. 1 (and certain elements of FIG. 2). Operation of system 210 is similar to that shown and described in connection with FIGS. 1 and 2, with the following exceptions. Additional laser sources 221 and 228 are added to the system to provide an output beam 260. Laser source 221 generates coherent photon paths 259 and 256. In pulse mode, laser sources 220, 222 and 226 are pumped to generate coherent photons, as are respectively laser sources 220, 221, and 228, and laser sources 221, 222 and 224. Peak power and/or repetition rate can be tripled as compared to system 10 shown in FIG. 1.

As will be appreciated by those skilled in the art, systems 10, 110 or 210 as respectively illustrated in FIGS. 1-3 can be extended by concatenation, "stacking" the systems so that the output beam of the system is directed into a laser amplifier of a substantially identical system. For example, such a stacked system would only require removal of either or both mirrors 30, 32; 130, 132; or 230, 232; and directing an output beam (such as beam 260) into the respective laser sources. Such systems permit further increase in repetition rate and peak power delivery, subject of course to absorption and scattering losses.

Although the invention has been described in detail with reference to the illustrated preferred embodiments, other variations and modifications exist within the scope and spirit of the invention as described and defined in the following claims.

What is claimed is:

1. A common output window assembly for combining a plurality of laser beams into a combined output beam, the laser beams being produced by first and second laser sources each respectively defining an optical axis for coherent light amplification, the common output window comprising a fully reflecting mirror positioned along the optical axis of the first laser source to reflect coherent light received from the first and second laser sources back toward the laser sources, and a beam splitter position at an intersection of the optical axes of the first and second laser sources to define an unimpeded optical path between the fully reflecting mirror and the beam splitter, with the beam splitter positioned between the first laser source and the fully reflecting mirror and at an angle with respect to the optical axes of the first and second laser sources, the beam splitter reflecting coherent light from the first laser source into the combined output beam and reflecting coherent light received from the fully reflecting mirror into the second laser source.

2. The common output window assembly of claim 1 further comprising a plurality of laser sources positioned to receive coherent light of the combined output beam to further amplify the combined output beam.

3. The common output window assembly of claim 1 further comprising a third laser source positioned along the optic axis of the second laser source between the second laser source and the second reflecting mirror.

4. The common output window assembly of claim 3 further comprising a plurality of laser sources positioned to receive coherent light of the combined output beam to further amplify the combined output beam.

5. The common output window assembly of claim 4 wherein a fourth, a fifth, and a sixth laser source are positioned along the optical axis of the second laser source to receive coherent light of the combined output beam to further amplify the combined output beam, with the fourth laser source respectively amplifying output of the second and third laser source, the fifth laser source respectively amplifying the output of the first and second laser source, and the sixth laser source respectively amplifying the output of the first and third laser source.

6. A laser beam combination system for directing a combined output beam of plurality of laser sources along a common optical axis, the system comprising
a first laser source having an optical axis for coherent light amplification,
a first reflecting mirror positioned perpendicular to the optical axis of the first laser source,
a second laser source having an optical axis for coherent light amplification,
a second reflecting mirror positioned perpendicular to the optical axis of the second laser source,
a fully reflecting mirror perpendicularly positioned on the optical axis of the first laser source to reflect light back toward the first laser source along the optical axis of the first laser source, and
a beam splitter for reflecting a portion of incident light, the beam splitter being positioned at an intersection of the optical axes of the first laser source and the second laser source to define an unimpeded optical path between the fully reflecting mirror and the beam splitter, with the beam splitter positioned to lie at an angle with respect to both the first and second optical axes to reflect coherent light from the first laser source into the combined output beam and also reflect coherent light received from the fully reflecting mirror into the second laser source.

7. The laser beam combination system of claim 6 further comprising a plurality of laser sources positioned to receive coherent light of the combined output beam to further amplify the combined output beam.

8. The laser beam combination system of claim 6 further comprising a third laser source positioned along the optic axis of the second laser source between the second laser source and the second reflecting mirror.

9. The laser beam combination system of claim 8 further comprising a plurality of laser sources positioned to receive coherent light of the combined output beam to further amplify the combined output beam.

10. The laser beam combination system of claim 9 wherein a fourth, a fifth, and a sixth laser source are positioned along the optical axis of the second laser source to receive coherent light of the combined output beam to further amplify the combined output beam, with the fourth laser source amplifying output of the second and third laser source, the fifth laser source amplifying the output of the first and second laser source, and the sixth laser source amplifying the output of the first and third laser source.

11. A laser beam combination system for directing a plurality of laser beams along a common optical output axis, the system comprising
a first laser source operated in a pulse mode and having an optical axis for coherent light amplification,
a first reflecting mirror positioned perpendicular to the optical axis of the first laser source,
a second laser source for coherent light amplification, the second laser source being operated in a pulse mode and having an optical axis coincident with the common optical output axis, with the coherent light amplification pulse occurring before or after the coherent light amplification pulse of the first laser source,
a second reflecting mirror positioned perpendicular to the optical axis of the second laser source and the common optical output axis
a fully reflecting mirror positioned to reflect coherent light received from the first laser source, and
a beam splitter positioned between the first laser source and the fully reflecting mirror to provide an unimpeded optical path between the fully reflecting mirror and the beam splitter, the beam splitter also being situated along the optical axis of the second laser source to reflect coherent light from the first laser source along the common optical output axis and reflect coherent light received from the fully reflecting mirror into the second laser source.

12. The laser beam combination system of claim 11 further comprising a plurality of laser sources positioned to receive coherent light directed along the common optical output axis to further amplify the coherent light.

13. The laser beam combination system of claim 11 further comprising a third laser source positioned along the optic axis of the second laser source between the second laser source and the second reflecting mirror, the third laser source being operated in a pulse mode and having an optical axis coincident with the common optical output axis, with the coherent light amplification pulse occurring at the same time as the coherent light amplification pulse of one of the first and second laser sources.

14. The laser beam combination system of claim 13 further comprising a plurality of laser sources positioned to receive coherent light along the common optical axis to further amplify the coherent light.

15. The laser beam combination system of claim 14 wherein a fourth, a fifth, and a sixth laser source are positioned along the common optical axis to receive coherent light, with the fourth laser source amplifying output of the second and third laser source, the fifth laser source amplifying the output of the first and second laser source, and the sixth laser source amplifying the output of the first and third laser source.

* * * * *